(12) United States Patent
Fernando et al.

(10) Patent No.: US 9,321,243 B2
(45) Date of Patent: *Apr. 26, 2016

(54) MULTI-LAYER THERMAL INSULATION COMPOSITE

(71) Applicant: UNIFRAX I LLC, Tonawanda, NY (US)

(72) Inventors: Joseph A. Fernando, Amherst, NY (US); Kennth B. Miller, Lockport, NY (US)

(73) Assignee: UNIFRAX I LLC, Tonawanda, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/168,529

(22) Filed: Jan. 30, 2014

(65) Prior Publication Data

US 2014/0147615 A1    May 29, 2014

Related U.S. Application Data

(63) Continuation of application No. 13/091,568, filed on Apr. 21, 2011, now Pat. No. 8,663,774.

(60) Provisional application No. 61/327,257, filed on Apr. 23, 2010.

(51) Int. Cl.
   *B32B 5/26* (2006.01)
   *B32B 5/24* (2006.01)
   (Continued)

(52) U.S. Cl.
   CPC ... *B32B 5/26* (2013.01); *B32B 5/24* (2013.01); *B32B 29/02* (2013.01); *E04B 1/94* (2013.01);
   (Continued)

(58) Field of Classification Search
   CPC .......................................................... B32B 5/26

USPC .............. 428/68, 74, 421, 422, 473.5, 479.6, 428/530; 442/1

See application file for complete search history.

(56) References Cited

U.S. PATENT DOCUMENTS

| 4,363,199 A | 12/1982 | Kucheria et al. |
| 4,600,634 A | 7/1986 | Langer |

(Continued)

FOREIGN PATENT DOCUMENTS

| EP | 0 706 979 A1 | 4/1996 |
| EP | 1 097 807 A2 | 5/2001 |

(Continued)

OTHER PUBLICATIONS

International Search Report, Form PCT/ISA/210, mailed Jan. 2, 2012, for corresponding PCT International Patent Application No. PCT/US2011/033440.

(Continued)

*Primary Examiner* — Brent O'Hern
(74) *Attorney, Agent, or Firm* — Curatolo Sidoti Co., LPA; Salvatore A. Sidoti; Floyd Trillis, III

(57) ABSTRACT

A multilayer thermal insulation composite for fire protection applications. The composite includes a fibrous insulation layer, at least one inorganic heat absorbing layer disposed on one side of the fibrous insulation layer, and at least one super-insulation layer disposed on at least one side of the composite adjacent the heat absorbing layer or the fibrous insulation layer. The composite may further include a scrim layer comprising a high temperature resistant, flexible, woven or non-woven scrim or scrim and high temperature resistant material disposed around the multilayer thermal insulation composite partially or substantially totally encapsulating the composite. The composite is lightweight and flexible, exhibits reduced heat transfer to the cold-face, with improved thermal insulation capability.

44 Claims, 2 Drawing Sheets

(51) Int. Cl.
   *B32B 29/02* (2006.01)
   *E04B 1/94* (2006.01)
(52) U.S. Cl.
   CPC . *B32B 2262/0238* (2013.01); *B32B 2262/0253* (2013.01); *B32B 2262/0261* (2013.01); *B32B 2262/0276* (2013.01); *B32B 2571/00* (2013.01); *C04B 2235/5232* (2013.01); *Y10T 29/49826* (2015.01); *Y10T 428/23* (2015.01); *Y10T 428/237* (2015.01); *Y10T 428/239* (2015.01); *Y10T 428/249921* (2015.04); *Y10T 428/249969* (2015.04); *Y10T 428/251* (2015.01); *Y10T 428/3154* (2015.04); *Y10T 428/31544* (2015.04); *Y10T 428/31721* (2015.04); *Y10T 428/31783* (2015.04); *Y10T 428/31964* (2015.04); *Y10T 442/10* (2015.04)

(56) References Cited

U.S. PATENT DOCUMENTS

| | | | |
|---|---|---|---|
| 4,612,239 | A | 9/1986 | Dimanshteyn |
| 4,942,903 | A | 7/1990 | Jacobsen |
| 4,943,465 | A | 7/1990 | Bailey et al. |
| 5,799,705 | A | 9/1998 | Friedrich et al. |
| 5,834,120 | A | 11/1998 | Murray et al. |
| 6,045,718 | A | 4/2000 | Holman et al. |
| 6,051,193 | A | 4/2000 | Langer et al. |
| 6,153,674 | A | 11/2000 | Landin |
| 6,403,180 | B1 | 6/2002 | Barrall |
| 6,458,418 | B2 | 10/2002 | Langer et al. |
| 6,521,834 | B1 | 2/2003 | Dykhoff et al. |
| 8,663,774 | B2 * | 3/2014 | Fernando et al. ............. 428/76 |
| 2002/0119717 | A1 | 8/2002 | Taylor et al. |
| 2003/0207155 | A1 | 11/2003 | Morrison et al. |
| 2003/0215640 | A1 | 11/2003 | Ackerman et al. |
| 2004/0258900 | A1 | 12/2004 | Simon et al. |
| 2005/0031843 | A1 | 2/2005 | Robinson et al. |
| 2008/0166937 | A1 * | 7/2008 | Garvey ............................ 442/1 |
| 2008/0206114 | A1 | 8/2008 | Hornback |
| 2009/0060802 | A1 | 3/2009 | Beauharnois |
| 2011/0036063 | A1 * | 2/2011 | Kumar .......................... 55/486 |

FOREIGN PATENT DOCUMENTS

| | | |
|---|---|---|
| GB | 2 424 260 A | 9/2006 |
| WO | WO 99/38933 A1 | 8/1999 |

OTHER PUBLICATIONS

Written Opinion, Form PCT/ISA/237, mailed Jan. 2, 2012, for corresponding PCT International Patent Application No. PCT/US2011/033440.

USPTO Office Action, cited from relation application. U.S. Appl. No. 12/947,149, mailed Dec. 2, 2011.

Aspen Aerogels; Nanotechnology at Work; http://wwwaerogel.com/features/morpohology.html, accessed Dec. 18, 2009.

Cabot Aerogel; Aerogel for Insulation, Daylighting, Additives; http://www.cabot-corp.com/Aerogel, accessed May 5, 2011.

Cabot Aerogel Thermal Wrap Ultimate Insulation for Outdoor Gear (CAB 06-129 brochure_v5; Nov. 9, 2006; 2:24 PM).

Aerogels—Cryogel Z Insulation for LNG; http://www.aerogel.com/markets/Cryogel_Z_LNG,html, accessed May 5, 2011.

* cited by examiner

MULTI-LAYER THERMAL INSULATION COMPOSITE

CROSS REFERENCE TO RELATED APPLICATIONS

This application is a continuation of U.S. Ser. No. 13/091,568, filed Apr. 21, 2011, now U.S. Pat. No. 8,663,774, which claims the benefit of the filing date under 35 USC 119(e) from U.S. Provisional Application For Patent Ser. No. 61/327,257, filed Apr. 23, 2010, both of which are hereby incorporated by reference.

TECHNICAL FIELD

Disclosed is a thermal insulation composite comprised of multiple layers. The thermal insulation composite is suitable for insulating applications involving fire and other high temperature environments.

BACKGROUND

There is a continuing need for fire protection materials that permit dissipation of heat and deter the spread of flames, smoke, vapors and/or heat during a fire. Various materials have been used to protect surfaces from excessive heat and flame, including, among others, insulative materials, endothermic materials, intumescent materials, opacifiers, and so-called "superinsulation materials".

The use of insulative materials such as ceramic or bio-soluble blankets, felt or thick paper-like material, or mineral wool blankets and boards are problematic because the materials are typically very thick and/or heavy. These materials are bulky and difficult to install. In addition, insulative materials can become detached from surfaces when the heat of a fire expands or destroys the means by which the insulative materials are attached.

Endothermic materials absorb heat, typically by releasing water of hydration, by going through a phase change that absorbs heat (i.e. liquid to gas), or by other physical or chemical change where the reaction requires a net absorption of heat to take place. Infrared opacifiers, such as carbon black, titanium dioxide, iron oxide, or zirconium dioxide, as well as mixtures of these, reduce the radiation contribution to thermal conductivity. When activated, endothermic materials and opacifiers restrict heat transfer and, consequently, keep the cold-face temperature lower than it would be absent such materials.

It is known to provide materials designed to retard the spread of fire and heat by an endothermic reaction. A known fire protection material in the form of semi-rigid or rigid boards or molded sections comprises an endothermic-reactive insulating fibrous material comprising (a) an inorganic endothermic filler which undergoes multiple endothermic reactions; (b) inorganic fiber material; and (c) an organic polymer binder. Another known material comprises an endothermic, flexible, fibrous, fire-protective sheet material made of a composition comprising (a) a refractory inorganic fiber; (b) an organic polymer binder, such as an acrylic resin; and (c) an inorganic, endothermic filler, such as alumina trihydrate, which undergoes an endothermic reaction between about 100° C. to 600° C.

Use of endothermic materials somewhat reduces the thickness problem inherent in insulation systems, but endothermics have their own problems. Due to the fact that the material has water molecules trapped in dry form, the system tends to be quite heavy, may be difficult to install and have high associated labor costs. Also, once installed, these systems are extremely difficult to remove and replace in order to perform maintenance work or to update electrical and communication networks hidden within a surface.

Intumescent materials expand to at least about 1.5 times their original volume upon heating to temperatures typically encountered in fire-like conditions, creating an insulation layer that separates the protected item from the fire. One major advantage of intumescent materials is that the unreacted material is thin and lightweight, and easier to install. Intumescent materials generally comprise a mixture of heat resistant inorganic fibers and an intumescent substance. In the event of a fire, the presence of the intumescent substance causes the intumescent material to expand to form an effective seal against the passage of fire and smoke.

The degree to which the intumescent fire protection material expands is important during a fire event, as the intumescent fire protection material must fill the space it is designed to occupy and must do so at a rapid rate. Accordingly, intumescence at the temperatures commonly encountered in a fire event, rapid rate of expansion, and a high degree of expansion are all desirable performance properties of an intumescent fire protection material. A high degree of expansion ensures that the intumescent fire protection material will expand firmly against the periphery of the opening to be sealed, thereby providing an effective seal against the passage of fire and smoke.

It is important in fire protections applications that, once the fire protection material has expanded in response to exposure to elevated temperatures during a fire, that the material cannot shrink if maintained at the increased temperature or exposed to repeated heating and cooling thermal cycling. Because of the low char strengths of sodium silicate-based materials, shrinkage occurs in both situations. Accordingly, intumescent materials that possess a high degree of expansion and char strength for use in passive fire protection applications, and which do not exhibit substantial shrinkage upon prolonged exposure to elevated temperatures or thermal cycling, are desired.

DETAILED DESCRIPTION

Figure 1:
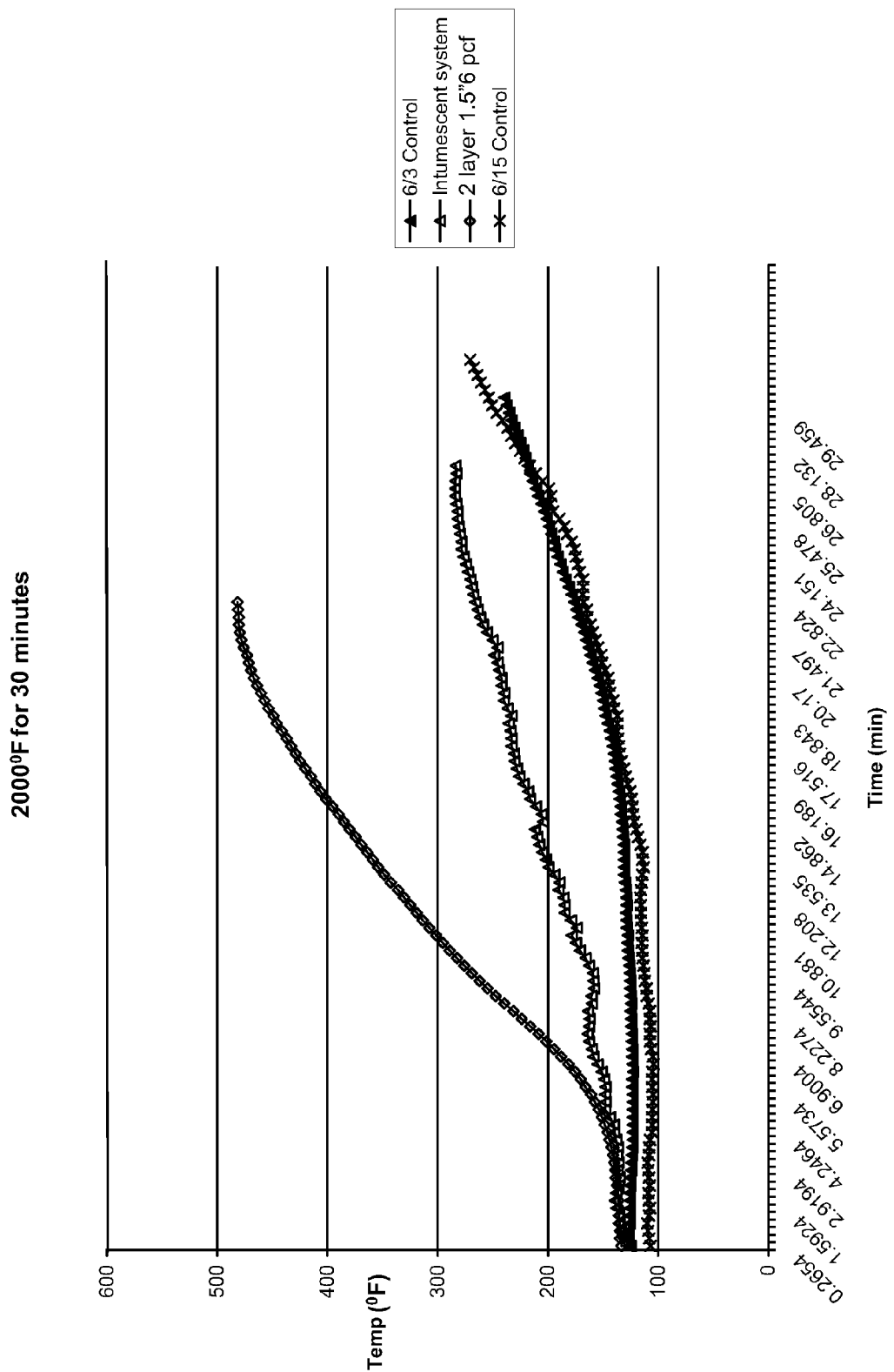
FIG. 1 is a graph depicting the rate of temperature rise on the cold side surface of specimens as a function of time during a flame test.

Provided is a multilayer thermal insulation composite. According to certain illustrative embodiments, the multilayer thermal insulation composite comprises (a) a fibrous insulation layer comprising inorganic fibers and optionally a binder and (b) least one superinsulation layer adjacent at least one side of the fibrous insulation layer.

According to other illustrative embodiments, the multilayer thermal insulation composite comprises (a) at least one inorganic heat absorbing layer and (b) at least one superinsulation layer adjacent at least one side of the inorganic heat absorbing layer.

According to further illustrative embodiments, the multilayer thermal insulation composite comprises (a) a fibrous insulation layer comprising inorganic fibers and optionally a binder; (b) at least one inorganic heat absorbing layer adjacent one side of the fibrous insulation layer; and (c) at least one superinsulation layer adjacent at least one side of the heat absorbing layer or the fibrous insulation layer.

The multilayer thermal insulation composite may further include a scrim layer comprising a high temperature resistant, flexible, woven or non-woven scrim that is disposed around the multilayer thermal insulation composite partially or substantially totally encapsulating the composite. The scrim layer may comprise a scrim and a high temperature resistant paper.

Further provided is a method for preparing a multilayer, thermal insulation composite comprising providing a first aqueous slurry containing materials suitable for making at least one superinsulation layer; providing either or both of (i) a second aqueous slurry containing materials suitable for making a fibrous insulation layer or (ii) a third aqueous slurry containing materials suitable for making at least one inorganic heat absorbing layer; depositing the first slurry onto a substrate; removing at least a portion of the liquid from the first slurry on the substrate to form a superinsulation layer; depositing the second slurry onto the substrate to form a fibrous insulation layer on the superinsulation layer or depositing the third slurry onto the substrate to form an inorganic heat absorbing layer on the superinsulation layer; removing at least a portion of the liquid from the fibrous insulation layer or the inorganic heat absorbing layer; drying the layers to form a multilayer material; and compressing the material. The material may be compressed up to about 200% to form a densified, compressed composite having a density of about 1 to about 30 lbs/cubic ft.

According to further embodiments, the method for making a multilayer thermal insulation composite comprises providing a plurality of layers comprising (a) at least one superinsulation layer and (b) either or both of (i) at least one fibrous insulation layer or (ii) at least one inorganic heat absorbing layer, and (iii) optionally a scrim layer; and affixing the layers to form a multilayer composite. The step of affixing the layers into a multilayer composite comprises affixing the layers together with at least one of an adhesive, a mechanical fastener, needling, sewing, stitching, or combinations thereof.

According to certain embodiments, the method for making a multilayer thermal insulation composite comprises providing a plurality of layers comprising (a) at least one superinsulation layer and (b) either or both of (i) at least one fibrous insulation layer or (ii) at least one inorganic heat absorbing layer; arranging the layers into a stack; and encapsulating the stack of layers. According to other embodiments, the method comprises (a) providing a stack of layers comprising at least one fibrous insulation layer, at least one inorganic heat absorbing layer, and at least one superinsulation layer and (b) at least partially encapsulating the stacked layers with a scrim.

Further provided is a method of thermally insulating or protecting an article from fire comprising contacting at least a portion of an article with a multilayer thermal insulation composite, the composite comprising (a) at least one superinsulation layer, (b) either or both of (i) a fibrous insulation layer comprising inorganic fibers; or (ii) at least one inorganic heat absorbing layer, and (c) optionally a scrim layer. The article to be protected may be partially or totally encapsulated by the multilayer thermal insulation composite.

Further provided is a method of thermally insulating or protecting an article from fire comprising contacting at least a portion of an article with a multilayer thermal insulation composite, the composite comprising (a) a fibrous insulation layer comprising inorganic fibers; (b) at least one inorganic heat absorbing layer disposed on one side of the fibrous insulation layer; (c) at least one superinsulation layer disposed on at least one side of the composite adjacent to the heat absorbing layer or the fibrous insulation layer; and (d) optionally a scrim layer comprising a high temperature resistant, flexible, woven or non-woven scrim disposed around the multilayer thermal insulation composite. The article to be protected may be partially or totally encapsulated by the multilayer thermal insulating composite.

The multilayer thermal insulation composite may comprise a fibrous insulation layer comprising inorganic fibers and optionally a binder, at least one inorganic heat absorbing layer that is disposed on one side of the fibrous insulation layer, and at least one superinsulation layer that is disposed on at least one side of the composite adjacent the heat absorbing layer or the fibrous insulation layer.

In certain embodiments, the composite further includes a scrim layer comprising a high temperature resistant, flexible, woven or non-woven scrim disposed around the multilayer thermal insulation composite partially or substantially totally encapsulating the composite. The scrim layer may comprise a thin layer of high temperature resistant material such as a ceramic fiber or bio-soluble fiber-based paper or felt that is laminated or otherwise attached to a reinforcement scrim.

Multiple layers are stacked and optionally a scrim is used to at least partially encapsulate the stacked layers. The multiple layers of the multilayer thermal insulation composite may optionally be affixed to each other with at least one of an adhesive, needle bonding, or stitching.

According to certain embodiments, the multilayer thermal insulation composite comprises (a) a fibrous insulation layer comprising from about 0 to about 50 weight percent binder and greater than 0 to about 100 weight percent inorganic fiber; (b) at least one inorganic heat absorbing layer comprising at least one of an endothermic layer or an intumescent layer, the endothermic layer comprising from about 0 to about 50 weight percent binder, from about 0 to about 90 weight percent inorganic fiber, and greater than 0 to about 50 weight percent endothermic filler, or the intumescent layer comprising greater than 0 to about 90 weight percent inorganic fiber, greater than 0 to about 50 weight percent intumescent substance, from about 0 to about 50 weight percent char strength enhancer, and from about 1 to about 20 weight percent binder, the at least one inorganic heat absorbing layer disposed on one side of the fibrous insulation layer; (c) a superinsulation layer disposed on at least one side of the composite adjacent the heat absorbing layer or the fibrous insulation layer, and (d) optionally a scrim layer adjacent to one of the layers of the multilayer composite or disposed around the multilayer thermal insulation composite partially or totally encapsulating the composite.

According to certain embodiments, the inorganic fibers that may be used to prepare the fibrous insulation layer comprise, without limitation, at least one of high temperature resistant biosoluble inorganic fibers, conventional high temperature resistant inorganic fibers, or mixtures thereof.

For purposes of illustration but not by way of limitation, suitable conventional heat resistant inorganic fibers that may be used to prepare the fibrous insulation layer, as well as other layers of the multilayer thermal insulation composite include refractory ceramic fibers, alkaline earth silicate fibers, mineral wool fibers, leached glass silica fibers, fiberglass, glass fibers and mixtures thereof.

In certain embodiments, the mineral wool fibers include without limitation, at least one of rock wool fibers, slag wool fibers, basalt fibers, glass wool fibers, and diabasic fibers. Mineral wool fibers may be formed from basalt, industrial smelting slags and the like, and typically comprise silica, calcia, alumina, and/or magnesia. Glass wool fibers are typically made from a fused mixture of sand and recycled glass materials. Mineral wool fibers may have a diameter of from about 1 to about 20 μm, in some instances from about 5 to about 6 μm.

According to certain embodiments, the high temperature resistant inorganic fibers that may be used to prepare the multilayer thermal insulation composite layers include, without limitation, high alumina polycrystalline fibers, refractory ceramic fibers such as alumino-silicate fibers, alumina-magnesia-silica fibers, kaolin fibers, alkaline earth silicate fibers such as calcia-magnesia-silica fibers and magnesia-silica fibers, S-glass fibers, S2-glass fibers, E-glass fibers, quartz fibers, silica fibers, leach glass silica fibers, fiberglass, or mixtures thereof.

Refractory ceramic fiber (RCF) typically comprises alumina and silica, and in certain embodiments, the alumino-silicate fiber may comprise from about 45 to about 60 percent by weight alumina and from about 40 to about 55 percent by weight silica. The RCF fibers are a fiberization product that may be blown or spun from a melt of the component materials. RCF may additionally comprise the fiberization product of alumina, silica and zirconia, in certain embodiments in the amounts of from about 29 to about 31 percent by weight alumina, from about 53 to about 55 percent by weight silica, and about 15 to about 17 weight percent zirconia. RCF fiber length is in certain embodiments, in the range of about 3 to about 6.5 mm, typically less than about 5 mm, and the average fiber diameter range is from about 0.5 μm to about 14 μm.

According to certain embodiments, the heat resistant inorganic fibers that are used to prepare the various layers of the multilayer thermal insulation composite comprise ceramic fibers. Without limitation, suitable ceramic fibers include alumina fibers, alumina-silica fibers, alumina-zirconia-silica fibers, zirconia-silica fibers, zirconia fibers and similar fibers. A useful alumino-silicate ceramic fiber is commercially available from Unifrax I LLC (Niagara Falls, N.Y.) under the registered trademark FIBERFRAX. The FIBERFRAX® ceramic fibers comprise the fiberization product of a melt comprising about 45 to about 75 weight percent alumina and about 25 to about 55 weight percent silica. The FIBERFRAX® fibers exhibit operating temperatures of up to about 1540° C. and a melting point up to about 1870° C. The FIBERFRAX® fibers are easily formed into high temperature resistant sheets and papers. In certain embodiments, the alumino-silicate fiber may comprise from about 40 to about 60 percent $Al_2O_3$ and about 60 weight percent to about 40 weight percent $SiO_2$, and in some embodiments, from about 47 to about 53 weight percent alumina and from about 47 to about 53 weight percent silica. The FIBERFRAX® fibers are made from bulk alumino-silicate glassy fiber having approximately 50/50 alumina/silica and a 70/30 fiber/shot ratio. About 93 weight percent of this paper product is ceramic fiber/shot, the remaining 7 percent being in the form of an organic latex binder. The FIBERFRAX® refractory ceramic fibers may have an average diameter of about 1 micron to about 12 microns.

High temperature resistant fiber, including ceramic fibers, which are useful in the multilayer thermal insulation composite include those formed from basalt, industrial smelting slags, alumina, zirconia, zirconia-silicates, chrome, zircon and calcium modified alumino-silicates and the like, as well as polycrystalline oxide ceramic fibers such as mullite, alumina, high alumina aluminosilicates, aluminosilicates, titania, chromium oxide and the like. In certain embodiments, the fibers are refractory. When the ceramic fiber is an alumino-silicate, the fiber may contain between about 55 to about 98% alumina and between about 2 to about 45% silica, in certain embodiments with the ratio of alumina to silica being between 70 to 30 and 75 to 25. Suitable polycrystalline oxide refractory ceramic fibers and methods for producing the same are contained in U.S. Pat. Nos. 4,159,205 and 4,277,269, which are incorporated herein by reference. FIBERMAX® polycrystalline mullite ceramic fibers are available from Unifrax I LLC (Niagara Falls, N.Y.) in blanket, mat or paper form.

The alumina/silica FIBERMAX® comprise from about 40 weight percent to about 60 weight percent $Al_2O_3$ and about 60 weight percent to about 40 weight percent $SiO_2$. The fiber may comprise about 50 weight percent $Al_2O_3$ and about 50 weight percent $SiO_2$. The alumina/silica/magnesia glass fiber typically comprises from about 64 weight percent to about 66 weight percent $SiO_2$, from about 24 weight percent to about 25 weight percent $Al_2O_3$, and from about 9 weight percent to about 10 weight percent MgO. The E-glass fiber typically comprises from about 52 weight percent to about 56 weight percent $SiO_2$, from about 16 weight percent to about 25 weight percent CaO, from about 12 weight percent to about 16 weight percent $Al_2O_3$, from about 5 weight percent to about 10 weight percent $B_2O_3$, up to about 5 weight percent MgO, up to about 2 weight percent of sodium oxide and potassium oxide and trace amounts of iron oxide and fluorides, with a typical composition of 55 weight percent $SiO_2$, 15 weigh percent $Al_2O_3$, 7 weight percent $B_2O_3$, 3 weight percent MgO, 19 weight percent CaO and traces of the above mentioned materials.

In certain embodiments, biosoluble alkaline earth silicate fibers such as calcia-magnesia-silicate fibers or magnesium-silicate fibers may be used to prepare the layers of the multilayer thermal insulation composite.

The term "biosoluble" inorganic fiber refers to inorganic fibers that are soluble or otherwise decomposable in a physiological medium or in a simulated physiological medium, such as simulated lung fluid. The solubility of the fibers may be evaluated by measuring the solubility of the fibers in a simulated physiological medium over time. A method for measuring the biosolubility (i.e.—the non-durability) of the fibers in physiological media is disclosed in U.S. Pat. No. 5,874,375 assigned to Unifrax I LLC, which is incorporated herein by reference. Other methods are suitable for evaluating the biosolubility of inorganic fibers. According to certain embodiments, the biosoluble inorganic fibers exhibit a solubility of at least 30 $ng/cm^2$-hr when exposed as a 0.1 g sample to a 0.3 ml/min flow of simulated lung fluid at 37° C. According to other embodiments, the biosoluble inorganic fibers may exhibit a solubility of at least 50 $ng/cm^2$-hr, or at least 100 $ng/cm^2$-hr, or at least 1000 $ng/cm^2$-hr when exposed as a 0.1 g sample to a 0.3 ml/min flow of simulated lung fluid at 37° C.

Without limitation, suitable examples of biosoluble alkaline earth silicate fibers that can be used to prepare the layers of the multilayer thermal insulation composite include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, each of which are incorporated herein by reference.

The high temperature resistant biosoluble alkaline earth silicate fibers are typically amorphous inorganic fibers that may be melt-formed, and may have an average diameter in the range of about 1 to about 10 μm, and in certain embodiments, in the range of about 2 to 4 μm. While not specifically required, the fibers may be beneficiated, as is well known in the art.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of about 60 to about 90 weight percent silica, from greater than 0 to about 35 weight percent magnesia and 5 weight percent or less impurities. According to certain embodiments, the alkaline earth silicate fibers comprise the fiberization product of about 65 to about 86 weight percent silica, about 14 to about 35 weight percent magnesia, 0 to about 7 weight percent zirconia and 5 weight percent or less impurities. According to other embodiments, the alkaline earth silicate fibers comprise the fiberization product of about 70 to about 86 weight percent silica, about 14 to about 30 weight percent magnesia, and 5 weight percent or less impurities. A suitable magnesium-silicate fiber is commercially available from Unifrax I LLC (Niagara Falls, N.Y.) under the registered trademark ISOFRAX. Commercially available ISOFRAX® fibers generally comprise the fiberization product of about 70 to about 80 weight percent silica, about 18 to about 27 weight percent magnesia and 4 weight percent or less impurities. ISOFRAX® alkaline earth silicate fibers may have an average diameter of about 1 micron to about 3.5 microns; in some embodiments, about 2 to about 2.5 microns.

According to certain embodiments, the biosoluble alkaline earth silicate fibers may alternatively comprise the fiberization product of a mixture of oxides of calcium, magnesium and silica. These fibers are commonly referred to as calcia-magnesia-silica fibers. According to certain embodiments, the calcia-magnesia-silicate fibers comprise the fiberization product of about 45 to about 90 weight percent silica, from greater than 0 to about 45 weight percent calcia, from greater than 0 to about 35 weight percent magnesia, and 10 weight percent or less impurities. Useful calcia-magnesia-silicate fibers are commercially available from Unifrax I LLC (Niagara Falls, N.Y.) under the registered trademark INSULFRAX. INSULFRAX® fibers generally comprise the fiberization product of about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Ga.) under the trade designations SUPERWOOL® 607 and SUPERWOOL® 607 MAX and SUPERWOOL® HT. SUPERWOOL® 607 fibers comprise about 60 to about 70 weight percent silica, from about 25 to about 35 weight percent calcia, and from about 4 to about 7 weight percent magnesia, and trace amounts of alumina. SUPERWOOL® 607 MAX fibers comprise about 60 to about 70 weight percent silica, from about 16 to about 22 weight percent calcia, and from about 12 to about 19 weight percent magnesia, and trace amounts of alumina. SUPERWOOL® HT fibers comprise about 74 weight percent silica, about 24 weight percent calcia and trace amounts of magnesia, alumina and iron oxide.

According to certain embodiments, the multilayer thermal insulation composite may optionally comprise other known non-respirable inorganic fibers (secondary inorganic fibers) such as silica fibers, leached silica fibers (bulk or chopped continuous), S-glass fibers, S2 glass fibers, E-glass fibers, fiberglass fibers, chopped continuous mineral fibers (including but not limited to basalt or diabasic fibers) and combinations thereof and the like, suitable for the particular temperature applications desired.

The secondary inorganic fibers are commercially available. For example, silica fibers may be leached using any technique known in the art, such as by subjecting glass fibers to an acid solution or other solution suitable for extracting the non-siliceous oxides and other components from the fibers. A process for making leached glass fibers is contained in U.S. Pat. No. 2,624,658 and in European Patent Application Publication No. 0973697.

Examples of suitable silica fibers include those leached glass fibers available from BelChem Fiber Materials GmbH, Germany, under the trademark BELCOTEX and from Hitco Carbon Composites, Inc. of Gardena, Calif., under the registered trademark REFRASIL, and from Polotsk-Steklovolokno, Republic of Belarus, under the designation PS-23(R).

Generally, the leached glass fibers will have a silica content of at least 67 percent by weight. In certain embodiments, the leached glass fibers contains at least 90 percent by weight, and in certain of these, from about 90 percent by weight to less than 99 percent by weight silica. The fibers are also substantially shot free.

The average fiber diameter of these leached glass fibers may be greater than at least about 3.5 microns, and often greater than at least about 5 microns. On average, the glass fibers typically have a diameter of about 9 microns, up to about 14 microns. Thus, these leached glass fibers are non-respirable.

The BELCOTEX® fibers are standard type, staple fiber pre-yarns. These fibers have an average fineness of about 550 tex and are generally made from silicic acid modified by alumina. The BELCOTEX® fibers are amorphous and generally contain about 94.5 silica, about 4.5 percent alumina, less than 0.5 percent sodium oxide, and less than 0.5 percent of other components. These fibers have an average fiber diameter of about 9 microns and a melting point in the range of 1500° to 1550° C. These fibers are heat resistant to temperatures of up to 1100° C., and are typically shot free and binder free.

The REFRASIL® fibers, like the BELCOTEX® fibers, are amorphous leached glass fibers high in silica content for providing thermal insulation for applications in the 1000° to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of 1 percent or less.

The PS-23® fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL® fibers, have a melting point of about 1700° C.

In certain embodiments, the high temperature resistant inorganic fibers may comprise an alumina/silica/magnesia fiber, such as S-2 Glass from Owens Corning, Toledo, Ohio. The alumina/silica/magnesia S-2 glass fiber typically comprises from about 64 weight percent to about 66 weight percent $SiO_2$, from about 24 weight percent to about 25 weight percent $Al_2O_3$, and from about 9 weight percent to about 11 weight percent MgO. S2 glass fibers may have an average diameter of about 5 microns to about 15 microns; in some embodiments, about 9 microns.

The E-glass fiber typically comprises from about 52 weight percent to about 56 weight percent $SiO_2$, from about 16 weight percent to about 25 weight percent CaO, from about 12 weight percent to about 16 weight percent $Al_2O_3$, from about 5 weight percent to about 10 weight percent $B_2O_3$, up to about 5 weight percent MgO, up to about 2 weight percent of sodium oxide and potassium oxide and trace amounts of iron oxide and fluorides, with a typical composition of 55 weight percent $SiO_2$, about 15 weigh percent $Al_2O_3$, about 7 weight percent $B_2O_3$, about 3 weight percent MgO, about 19 weight percent CaO and traces up to about 0.3 weight percent of the other above mentioned materials.

The composite may further include one or more binders in each of the respective layers. Optionally, the fibrous insulation layer includes a binder. Suitable binders include organic binders, inorganic binders and mixtures of these two types of binders. According to certain embodiments, the multilayer thermal insulation composite includes one or more organic binders. The organic binders may be provided as a solid, a liquid, a solution, a dispersion, a latex, or similar form. The organic binder may comprise a thermoplastic or thermoset binder, which after cure is a flexible material. Examples of suitable organic binders include, but are not limited to, acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resin binders include low temperature, flexible thermosetting resins such as unsaturated polyesters, epoxy resins and polyvinyl esters (such as polyvinylacetate or polyvinylbutyrate latexes). According to certain embodiments, the multilayer thermal insulation composite utilizes an acrylic resin binder.

The organic binder may be included in the fibrous insulation layer in an amount of from 0 to about 50 weight percent, in certain embodiments from about 0 to about 20 weight percent, and in other embodiments from about 0 to about 10 weight percent, based on the total weight of the layer.

The layer may include polymeric binder fibers instead of, or in addition to, a resinous or liquid binder. These polymeric binder fibers, if present, may be used in amounts ranging from greater than 0 to about 20 percent by weight, in other embodiments from greater than 0 to about 10 percent by weight, and in further embodiments from about 0 to about 5 weight percent, based upon 100 percent by weight of the total composite, to aid in binding the fibers together. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof.

Solvents for the binders, if needed, may include water or a suitable organic solvent, such as acetone, for the binder utilized. Solution strength of the binder in the solvent (if used) can be determined by conventional methods based on the binder loading desired and the workability of the binder system (viscosity, solids content, etc.).

The fibrous insulation layer of the multilayer thermal insulation composite may also include an inorganic binder in addition to or in place of the organic binder. In the event that an inorganic binder is included in the multilayer thermal insulation composite, the inorganic binder may include, but is not limited to, colloidal silica, colloidal alumina, colloidal zirconia, and mixtures thereof, sodium silicate, and clays, such as bentonite, hectorite, kaolinite, montmorillonite, palygorskite, saponite, or sepiolite, and the like.

The inorganic binder may optionally be included in the fibrous insulation layer in an amount from about 0 to about 50 weight percent, and in other embodiments from 0 to about 25 weight percent, based on the total weight of the fibrous insulation layer, with the remainder comprising inorganic fiber.

An opacifier may optionally be included in the fibrous insulation layer in an amount from about 0 to about 20 weight percent, from about 0 to about 10 weight percent, or about 0 to about 5 weight percent, based on the total weight of the fibrous insulation layer, with the remainder comprising inorganic fiber and optionally a binder.

In certain embodiments, the fibrous insulation layer may take the form of an insulation blanket, felt, paper-like material, mat or sheet. Additional known additives may be included to provide desirable characteristics, such as fire or flame resistance, mold resistance, pest resistance, mechanical properties, and the like.

In certain embodiments, the inorganic heat absorbing layer comprises at least one of an intumescent layer or an endothermic layer.

According to certain embodiments, the inorganic heat absorbing layer is an endothermic layer comprising inorganic fibers, a binder, an inorganic, endothermic filler and optionally an opacifier. In certain embodiments, the endothermic layer may comprise from about 0 to less than about 50 weight percent binder; from 0 to about 90 weight percent inorganic fiber; from about 0 to about 50 weight percent endothermic filler, and optionally from about 0 to about 20 weight percent opacifier, based on the total weight of the endothermic layer.

In certain embodiments, the endothermic layer comprises about 5 weight percent binder, about 85 weight percent inorganic fiber, about 5 weight percent endothermic filler, and optionally about 5 weight percent opacifier, based on the total weight of the endothermic layer.

Suitable heat resistant inorganic fibers that may be used in the endothermic layer include, without limitation, refractory ceramic fibers, alkaline earth silicate fibers, mineral wool fibers, leached glass silica fibers, fiberglass, glass fibers and mixtures thereof, as described above in connection with the fibrous insulation layer.

The endothermic layer may further include one or more binders. Suitable binders include organic binders, inorganic binders and mixtures of these two types of binders. In certain embodiments, the binder may be included in the endothermic layer in an amount from about 0 to less than about 50 weight percent binder; or about 5 weight percent, based on the total weight of the endothermic layer, with the remainder comprising from 0 to about 90 weight percent inorganic fiber and about 0 to about 50 weight percent endothermic filler. Without limitation, an example of a suitable binder is HyCar® 26083 Latex available from Noveon, Inc.

In certain embodiments, the endothermic filler may be selected from alumina trihydrate and magnesium carbonate, and other hydrated inorganic materials including cements, hydrated zinc borate, calcium sulfate (also known as gypsum), magnesium ammonium phosphate, magnesium hydroxide and mixtures thereof. The weight ratio of endothermic filler to inorganic fiber is in the range of about 0.25:1 to about 30:1.

In certain embodiments, the endothermic material is activated to maintain the cold-face temperature significantly below what it would be absent the endothermic material. In certain embodiments, an opacifier selected from titanium dioxide, iron titanium oxide, zirconium silicate and iron oxide, and is optionally added to keep the cold face temperature lower by restricting heat transfer.

In certain embodiments, the inorganic heat absorbing layer may be an intumescent layer comprising heat resistant inorganic fibers, an intumescent substance, binder, optionally a char strength enhancer and optionally an opacifier.

According to certain embodiments, the intumescent layer comprises from 0 to about 90 weight percent inorganic fiber, from about 0 to about 50 weight percent intumescent substance, from about 0 to about 20 weight percent binder, and from about 0 to about 50 weight percent char strength enhancer.

According to certain embodiments, the intumescent layer comprises from about 15 to about 50 weight percent heat resistant inorganic fiber, from about 20 to about 50 weight percent intumescent substance, from about 0 to about 20 weight percent organic binder, and optionally about 0 to about 50 weight percent char strength enhancer.

In certain embodiments, the intumescent layer may comprise from about 35 weight percent inorganic fiber, from about 30 weight percent intumescent substance, from about 30 weight percent char strength enhancer and from about 5 weight percent binder.

Suitable heat resistant inorganic fibers that may be used for preparing the intumescent layer include, without limitation, refractory ceramic fibers, alkaline earth silicate fibers, mineral wool fibers, leached glass silica fibers, fiberglass, glass fibers, and mixtures thereof, as described above in connection with the fibrous insulation layer and the endothermic layer.

In certain embodiments, the intumescent substance that may be used to prepare the intumescent layer includes, without limitation, unexpanded vermiculite, expandable graphite, perlite, hydrobiotite, water-swelling tetrasilicic flourine mica, or mixtures thereof. The intumescent layer may include a mixture of more than one type of intumescent material. According to certain illustrative embodiments, the intumescent substance used to prepare the intumescent layer comprises expandable graphite.

In certain embodiments, the intumescent fire protection material further optionally incorporates an effective amount of a char strength enhancing material. Without limitation, the char strength enhancing material comprises alkali metal silicates, colloidal silicas, colloidal alumina, inorganic acids and phosphates. According to certain illustrative embodiments, the char strength enhancing material comprises an alkali metal silicate, such as sodium silicate.

In certain embodiments, the intumescent layer includes a binder or mixture of more than one type of binder. Suitable binders include organic binders, inorganic binders and mixtures of these two types of binders. According to certain embodiments, the intumescent layer includes one or more organic binders. The organic binders may be provided as a solid, a liquid, a solution, a dispersion, a latex, or similar form. The organic binder may comprise a thermoplastic or thermoset binder, which after cure is a flexible material. Examples of suitable organic binders include, but are not limited to, acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters. According to certain embodiments, the intumescent layer utilizes an acrylic latex binder.

In certain embodiments, the organic binder may be included in the intumescent layer in an amount from 2 to about 20 weight percent, or from about 3 to about 15 weight percent, from about 5 to about 10 weight percent, or from about 2 to about 8 weight percent, based on the total weight of the intumescent material.

According to certain embodiments, the intumescent layer may include polymeric binder fibers instead of, or in combination with, the resinous or liquid binder. These polymeric binder fibers may be used in amounts ranging from greater than 0 to about 20 percent by weight, from about 1 to about 15 weight percent, and from about 2 to about 10 weight percent, based upon 100 percent by weight of the total composition. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof.

According to certain embodiments, the intumescent layer may also include an inorganic binder in addition to the organic binder. In the event that an inorganic binder is included in the composite, the inorganic binder may be selected from colloidal alumina, colloidal silica, colloidal zirconia and mixtures thereof, as well as sodium silicate and clays, as described above in connection with the fibrous insulation layer.

According to certain embodiments, the intumescent layer comprises about 20 to about 50 weight percent expandable graphite, about 15 to about 50 weight percent heat resistant fibers, about 10 to about 50 weight percent char strength enhancer, and about 2 to about 20 weight percent organic binder.

According to other embodiments, the intumescent layer comprises about 20 to about 50 weight percent expandable graphite, about 15 to about 50 weight percent heat resistant fibers, about 10 to about 50 weight percent sodium silicate as the char strength enhancer, and about 2 to about 20 weight percent acrylic latex organic binder.

According to certain embodiments, the intumescent layer comprises about 30 weight percent expandable graphite, about 35 weight percent heat resistant fibers, about 30 weight percent char strength enhancer, and about 5 weight percent organic binder.

According to certain embodiments, the intumescent layer comprises about 30 weight percent expandable graphite, about 35 weight percent ceramic fibers as the heat resistant fibers, about 30 weight percent sodium silicate as the char strength enhancer, and about 5 weight percent acrylic latex as organic binder.

The term "superinsulation layer" refers to an insulation layer having a lower thermal conductivity as compared to the fibrous insulation layer. Superinsulation materials, such as microfiber glass based Excelfrax® available from Unifrax Corp., Germany and microporous silica materials such as Excelfrax® and WDS have extremely low thermal conductivity and exhibit superior insulating characteristics, resulting in significant space, weight and energy savings while maintaining thermal performance. Due to their ability to minimize heat transfer by conduction (solid and gas), convection, and radiation, superinsulation materials provide thermal stability and a higher level of thermal efficiency compared to more traditional insulating materials.

According to other embodiments, an aerogel material may be used as the superinsulation material. The aerogel material may be provided in a form of a flexible blanket or sheet. Without limitation, suitable aerogels are commercially available from Cabot Corporation (Boston, Mass.) under the designation Nanogel Aerogel, and from Aspen Aerogels, Inc. (Northborough, Mass.) under the designations Pyrogel XTF and Cryogel Z.

The lower the thermal conductivity, the more effective the insulation. Superinsulation materials, such as microfiber based EXCELFRAX 550 available from Unifrax and microporous silica materials, are distinguished by their extremely low thermal conductivity. In porous insulation materials, heat is transferred via conduction through the solid material structure, the intervening gas and by thermal radiation. Infrared opacifiers comprising, for example, infrared active oxides or carbides, diffuse or absorb the thermal radiation in the insulation system.

The term "microporous" refers to porous or cellular materials in which the size of the cells or voids is less than the mean free path of an air molecule at NTP, i.e., on the order of 100 nm or smaller. Such microporous materials exhibit very low heat transfer by air conduction (that is, collisions between air molecules). Such microporous materials include aerogel, i.e., a gel in which the liquid phase has been replaced by a gaseous phase in such a way as to avoid the shrinkage that would occur if the gel were dried directly from a liquid. Similar structures are obtained by controlled precipitation from solution, the temperature and pH being controlled during precipitation to obtain an open lattice precipitate. Other equivalent open lattice structures include pyrogenic (fumed) and electro-thermal types in which a substantial proportion of the particles have an ultimate particle size less than 100 nm.

In certain embodiments, the superinsulation layer may include at least one material from a class of materials available as thin, flexible sheets that exhibit low thermal conductivity and are substantially non-intumescent. The term "substantially non-intumescent material" is defined as a material that does not expand beyond the coefficient of thermal expansion for the material. In certain embodiments the superinsulation layer is a microporous insulation layer comprising a thin, flexible sheet exhibiting extremely low thermal conductivity.

In certain embodiments, the superinsulation layer may comprise Excelfrax® microporous silica insulation available from Unifrax I LLC (Niagara Falls, N.Y.) which comprises inorganic oxides, primarily fumed silica, with silicates and opacifiers.

In certain embodiments, the microporous superinsulation layer comprises finely divided metal oxide and an opacifier, that is, a material that minimizes infra-red radiation; and optionally reinforcing inorganic fiber. The superinsulation layer, in its pre-installed form, may be sealed in a polymeric film, such as polyethylene, although the film may be selected for economy and functionality rather than composition.

According to certain embodiments, the finely divided metal oxide may comprise at least one of pyrogenic silicas, arc silicas, low-alkali precipitated silicas, fumed silica, silicon dioxide aerogels, aluminum oxides, and mixtures thereof. In one embodiment, the finely divided metal oxide comprises fumed silica. The finely divided metal oxide may have a specific BET surface area of from about 50 to about 700 $m^2/g$, or from about 70 to about 400 $m^2/g$.

According to certain embodiments, the opacifier may comprise at least one of ilmenite, titanium dioxide, iron(II)/iron(III) mixed oxides, chromium dioxide, zirconium oxide, manganese dioxide, iron oxide, rutile, zirconium silicate, silicon carbide, and mixtures thereof. The opacifier may have a particle size in the range from about 0.1 to about 10 microns.

In certain embodiments, the reinforcing fiber of the superinsulation layer may comprise a broad family of materials. The family of materials includes any inorganic fiber capable of providing the structure necessary to retain the microporous particles in a cohesive unit. In some embodiments the reinforcing fiber is selected from the group consisting of aluminum silicate, magnesium silicate, rockwool, or combinations thereof. In certain embodiments, reinforcing fiber of the superinsulation layer may comprise at least one of textile glass fibers or quartz fibers, such as high-temperature-resistant fibers having a $SiO_2$ content of greater than 60% by weight, and in some embodiments greater than 90% by weight, silica fibers, textile fibers made from R glass, textile fibers made from S2 glass, textile fibers made from ECR glass, and fibers made from aluminum silicate.

In certain embodiments, a suitable superinsulation layer may comprise at least one sheet commercially available from Porextherm GmbH (Kempten, Germany), comprising 55 weight % of HDK N25 highly dispersed silica (BET 280 $m^2/g$), 40 weight % of zirconium silicate, 5% of textile glass fibers (silicon content>92%) having a density of 320 $kg/m^3$ and a thickness of 10 mm. This sheet is substantially incompressible.

In certain embodiments, WDS® Flexible Contour insulation, available from Wacker Chemie GmbH (Kempten, Germany). WDS® Flexible Contour microporous insulation (WDS) is an exemplative material comprising about 50% silica, about 45% zirconium silicate, and about 5% of other materials, including reinforcing glass fibers may be used as a superinsulation layer which exhibits the low thermal conductivity in a low density, thin material. Without limitation, WDS® Flexible Contour is commercially produced in 3 mm, 5 mm, 7 mm, 10 mm, and 20 mm thicknesses. Similar microporous superinsulation material is available from Microtherm (Alcoa, Tenn.).

In certain embodiments, a woven or nonwoven, organic or inorganic scrim is disposed around the multilayer thermal insulation composite partially or totally encapsulating the composite, or may applied adjacent to at least one surface of the multi-layer thermal insulation composite, to impart added strength, abrasion and tear resistance, and resistance to cracking for certain applications. In certain embodiments, the scrim wraps or partially or substantially totally envelops the composite, encompassing all the layers of the multi-layer thermal insulation composite, so that the composite may be handled, cut and installed properly. An additional benefit is the minimization of heat transfer during fire testing. The scrim may be a woven or nonwoven material made from fibers. The scrim may be fiberglass, nylon or polyester mesh. Suitable scrim materials also include, but are not limited to, silica fibers, refractory ceramic fibers (RCF), mineral fibers, soluble fibers or any other type of inorganic fire resistant fibers.

The average thickness of the scrim may vary. The average thickness of the scrim may range from about 5 to about 2000 micrometers, or from about 100 to about 1000 micrometers. The layer of scrim is lightweight, strong, and at least relatively nonflammable.

In certain embodiments, the layer of scrim may optionally be adhered to the composite layers. In certain embodiments, the multilayer thermal insulation composite may be heat sealed with an adhesive to partially or substantially totally envelop or encapsulate the layers of the multilayer thermal insulation composite. The adhesive may optionally contain conventional fire retardant additives, and optionally may be associated with a reinforcing scrim, in some embodiments comprising a fiberglass, nylon or polyester mesh on at least one side of the composite. The scrim may be disposed within the adhesive layer, or may be on the surface of the adhesive.

In certain embodiments intended for fire-blocking applications, a relatively thin layer of fire-blocking material such as a ceramic fiber or bio-soluble fiber-based paper or felt laminated to a reinforcement scrim may be used to wrap the expanding multilayer thermal insulation composite so that it can be easily handled, cut and installed. The scrim and the fire-blocking layer may be coated with a thermoplastic or heat-activated adhesive for adhering the scrim/fire-blocking layer to the multilayer composite. In an alternative embodiment not intended for fire-blocking applications, the fire-blocking material may be replaced by a layer of material that is relatively high-strength and preferably flame-resistant, but without fire-blocking properties. It may likewise be reinforced with a scrim and adhered to the composite.

The multi-layer thermal insulation composite may be produced in any way known in the art for forming sheet-like materials. For example, conventional paper-making processes, either hand laid or machine laid, may be used to prepare the multi-layer thermal insulation composite. A handsheet mold, a Fourdrinier paper machine, or a rotoformer paper machine can be employed to make the multi-layer thermal insulation composite.

In certain embodiments, the multi-layer thermal insulation composite may be prepared by combining and mixing the ingredients of each respective layer, such as by forming an aqueous slurry of the formulation ingredients for each layer. The slurry may be flocculated with a flocculating agent and drainage retention aid chemicals. The flocculated mixture or slurry for each of the respective layers is cast or placed onto a papermaking machine to be formed into a multilayer ply or sheet of fiber containing paper. The sheet is dewatered and dried by air drying or oven drying. For a more detailed description of standard papermaking techniques employed, see U.S. Pat. No. 3,458,329, the disclosure of which is incorporated herein by reference.

Alternatively, the plies or sheets may be formed by vacuum casting the slurry with conventional equipment. According to this method, the slurry of components is wet laid onto a pervious web. A vacuum is applied to the web to extract the majority of the moisture from the slurry, thereby forming a wet sheet. The wet plies or sheets are then dried, typically in an oven. The sheet may be passed through a set of rollers to compress the sheet prior to drying. The resulting layers are stacked one on top of the other in the order indicated. Optionally, the resulting layers are attached or adhered together. The multi-layer thermal insulation composite is then enveloped or encapsulated partially or substantially totally by the scrim layer to hold the composite together. The multiple layers of the composite may optionally be glued, stitched or otherwise bonded in some fashion.

Regardless of which of the above-described techniques are employed, the sheet material may be cut or slit, such as by die stamping or slitting, to form sheets of exact shapes and sizes with reproducible tolerances.

Resilient composites in a range of thicknesses can be produced. Sheets which are about 0.5 mm to about 150 mm thick are especially useful in firestop applications. Composite sheets of lesser thickness can be stacked to produce thicker material as a given application requires. Variations in the composition of the sheets lead to changes in its density in the range of about 0.04 grams/cm$^3$ to about 0.25 grams/cm$^3$.

In certain other embodiments, a method for making a multilayer thermal insulation composite comprises (a) providing a stack of layers comprising a fibrous insulation layer, at least one inorganic heat absorbing layer and at least one superinsulation layer; (b) optionally affixing the stack of layers together with at least one of an adhesive, needle bonding or stitching; and (c) optionally at least partially encapsulating the stacked layers with a reinforcing scrim layer.

EXAMPLES

The following examples are intended to merely further exemplify illustrative embodiments of the multilayer thermal insulation composite and the process for preparing the composite. It should be understood that these examples are for illustration only and should not be considered as limiting the claimed multilayer thermal insulation composite, the process for preparing the multilayer thermal insulation composite, products incorporating the multilayer thermal insulation composite, or processes for using the multilayer thermal insulation composite.

Several examples of known, commercially available fire protection materials were used for purposes of testing as controls against the inventive samples. Multiple layers are stacked and centered with respect to each other. The multiple layers may optionally be glued, bonded, stitched or otherwise affixed to each other. Optionally, a scrim layer is used to at least partially encapsulate the stacked layers.

Comparative Ex. 1 ("C1")=two layers of 2 inch, 8 PCF density Insulfrax® blanket from Unifrax 1 LLC (identified as "6/3 Control" in FIGS. 1 and 2) stacked on top of each other and optionally attached or adhered together.

Comparative Ex. 2 ("C2")=two layers of 0.5 inch intumescent material (identified as "Intumescent system" in FIGS. 1 and 2) stacked on top of each other and optionally attached or adhered together.

Comparative Ex. 3 ("C3")=two layers of 1.5 inch, 6 PCF Insulfrax® blanket from Unifrax 1 LLC (identified as "2-layer, 1.5"6pcf" in FIGS. 1 and 2), stacked on top of each other and optionally attached or adhered together.

Figure 2:
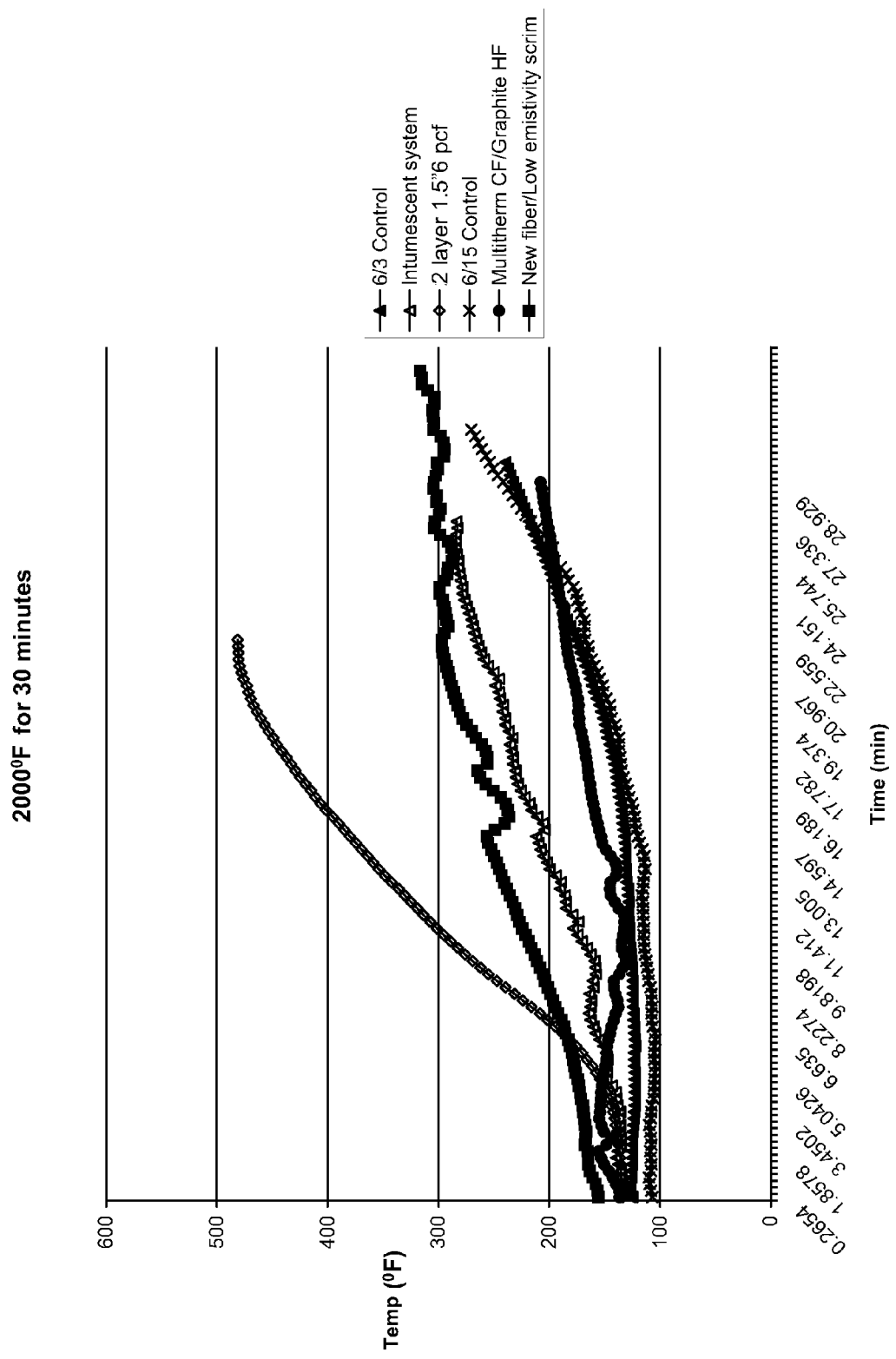
FIG. 2 is a graph depicting the rate of temperature rise on the cold side surface of specimens as a function of time during a flame test.

Comparative Ex. 4 ("C4")=two layers of 1.5 inch, 6 PCF Insulfrax® blanket from Unifrax 1 LLC stacked on top of each other and optionally attached or adhered together and encapsulated with a 1 mm thick insulating fire-resistant scrim (identified as "New Fiber/Low emistivity scrim" in FIG. 2).

Comparative Ex. 5 ("C5")=two layers of 2 inch, 8 PCF density Insulfrax® blanket from Unifrax 1 LLC (identified as "6/15 Control" in FIGS. 1 and 2) stacked on top of each other and optionally attached or adhered together.

Inventive Ex. 1

A specimen of the multilayer thermal insulation composite was prepared for testing by stacking a layer, 6 mm thick, of microporous insulation commercially available as Excelfrax from Unifrax on the hot face, and a layer, 12 mm thick, of intumescent material commercially available as Graphite HF from Asbury Graphite. This material is identified as "Excelfrax/Graphite HF" in FIG. 2. This specimen was not encapsulated with a fire resistant scrim. It is expected that encapsulation with the scrim material would further improve performance, i.e., lower the cold face temperature.

Flame Resistance Test

Inventive Ex. 1 and Comparative Ex.C1-C5 were evaluated for fire resistance. The flame resistance of the multilayer thermal insulation composite was evaluated using a flame test according ASTM 2336. Flame tests were conducted in a 24"×24" gas fuelled test furnace and tested using the E2336 heat curve (2000° F. FOR 30 MINUTES). Sample sizes were 18"×22" for sidewall tests and 24"×24" for ceiling tests.

FIG. 1 depicts the rate of temperature rise on the cold side surface of specimens tested as a function of time during a flame test. The results show that the multilayer composite performed better on flame tests as compared to double layer fiber-only insulating blankets. The inventive composite sample maintained a much lower temperature for a significantly longer time than the control samples. Best results, i.e., the lowest cold face temperature rise, were observed when the endothermic layer was placed on the non-fire side of the article to be protected.

FIG. 2 depicts the rate of temperature rise on the cold side surface of specimens tested as a function of time during a flame test. The results show that the multilayer composite performed better on flame tests as compared to double layer fiber only insulating blankets. Best results, i.e., the lowest cold face temperature rise, were observed with the Excelfrax CF/Graphite HF composite. This system was not encapsulated with a fire resistant scrim. It is expected that encapsulation with the scrim material would further improve performance, i.e., lower the cold face temperature.

The present multiple layer composite for thermal insulation or fire protection composites has multiple layers that are optionally affixed in some fashion, are thin and lightweight during handling and installation and which may expand to final thickness in the event of a fire and a rise in temperature. The multiple layer composites have a very low thermal conductivity. Because the present multiple layer composite has a reduced thickness as compared to commercially available insulation systems, it is durable, easier to handle and requires less space, labor and time to install than separate layers. Because of the ease of handling and installation, the present multiple layer composite is suitable for duct and pipe insulation applications, as well as hazardous waste, explosives, and chemical container insulation applications. The fire protection material is particularly useful as a fire protection material in areas of limited space such as airframe structures.

While the multilayer thermal insulation composite and process for preparing the same have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the multilayer thermal insulation composite and process should not be limited to any single embodiment, but rather construed in breadth and scope in accordance with the recitation of the appended claims.

The invention claimed is:

1. A multilayer thermal insulation composite comprising:
at least one superinsulation layer comprising a superinsulation material comprising one or more of an aerogel, microfiber glass, or microporous silica; and
(i) at least one fibrous insulation layer comprising inorganic fibers and optionally (ii) at least one inorganic heat absorbing layer;
wherein the inorganic fibers comprise at least one of biosoluble inorganic fibers, conventional inorganic fibers, or mixtures thereof, and
wherein the conventional inorganic fibers comprise at least one of refractory ceramic fibers, mineral wool fibers, glass fibers, silica fibers, leached glass silica fibers, fiberglass, or mixtures thereof.

2. The composite of claim 1 comprising:
said at least one superinsulation layer; and
at least one fibrous insulation layer comprising inorganic fibers.

3. The composite of claim 1 comprising:
said at least one superinsulation layer; and
at least one inorganic heat absorbing layer.

4. The composite of claim 1 comprising:
said at least one superinsulation layer;
at least one fibrous insulation layer comprising inorganic fibers; and
at least one inorganic heat absorbing layer.

5. The composite of claim 1, further comprising a scrim layer disposed adjacent one or more of the layers of the composite, or disposed around the multilayer thermal insulation composite partially or totally encapsulating the composite.

6. The composite of claim 1, wherein the scrim layer comprises a scrim and a ceramic fiber paper or biosoluble fiber paper.

7. The composite of claim 1, wherein the refractory ceramic fibers comprise alumina-silica fibers.

8. The composite of claim 7, wherein the alumina-silica fibers comprise a fiberization product of about 45 to about 75 weight percent alumina and about 25 to about 55 weight percent silica.

9. The composite of claim 1, wherein the biosoluble inorganic fibers comprise alkaline earth silicate fibers.

10. The composite of claim 9, wherein the alkaline earth silicate fibers comprise at least one of calcium-magnesia-silicate fibers, magnesium-silicate fibers, or mixtures thereof.

11. The composite of claim 10, wherein the magnesium-silicate fibers comprise a fiberization product of about 70 to about 86 weight percent silica, about 14 to about 30 weight percent magnesia and about 5 weight percent or less impurities.

12. The composite of claim 11, wherein the magnesium-silicate fibers comprise a fiberization product of about 70 to about 80 weight percent silica, about 18 to about 27 weight percent magnesia and 0 to 4 weight percent impurities.

13. The composite of claim 10, wherein the calcium-magnesia-silicate fibers comprise a fiberization product of about 45 to about 90 weight percent silica, greater than 0 to about 45 weight percent calcia, and greater than 0 to about 35 weight percent magnesia.

14. The composite of claim 13, wherein the calcium-magnesia-silicate fibers comprise a fiberization product of about 60 to about 70 weight percent silica, from about 16 to about 35 weight percent calcia, and from about 4 to about 19 weight percent magnesia.

15. The composite of claim 14, wherein the calcium-magnesia-silicate fibers comprise a fiberization product of about 61 to about 67 weight percent silica, from about 27 to about 33 weight percent calcia, and from about 2 to about 7 weight percent magnesia.

16. The composite of claim 1, wherein the heat absorbing layer comprises from about 20 to about 50 weight percent intumescent substance, about 15 to about 50 weight percent heat resistant inorganic fiber, 0 to about 20 weight percent organic binder, and optionally 0 to about 50 weight percent char strength enhancer.

17. The composite of claim 16, wherein the intumescent substance comprises unexpanded vermiculite, expandable graphite, perlite, hydrobiotite, water-swelling tetrasilicic flourine mica, or mixtures thereof.

18. The composite of claim 17, wherein the intumescent substance comprises expandable graphite.

19. The composite of claim 16, wherein the char strength enhancer comprises alkali metal silicates, colloidal silica, colloidal alumina, inorganic acids, phosphates and mixtures thereof.

20. The composite of claim 19, wherein the char strength enhancer comprises an alkali metal silicate.

21. The composite of claim 20, wherein the alkali metal silicate comprises sodium silicate.

22. The composite of claim 1, wherein the heat absorbing layer comprises an endothermic layer comprising from 0 to less than about 50 weight percent binder; from 0 to about 90 weight percent inorganic fiber; from 0 to about 50 weight percent endothermic filler, and optionally from 0 to about 20 weight percent opacifier, based on a total weight of the endothermic layer.

23. The composite of claim 22, wherein the endothermic layer comprises about 5 weight percent binder, about 85 weight percent inorganic fiber, about 5 weight percent endothermic filler and optionally about 5 weight percent opacifier, based on the total weight of the endothermic layer.

24. The composite of claim 22, wherein the endothermic filler comprises alumina trihydrate, magnesium carbonate hydrated cements, hydrated zinc borate, calcium sulfate, magnesium ammonium phosphate, magnesium hydroxide or mixtures thereof.

25. The composite of claim 22, wherein an endothermic filler to inorganic fiber weight ratio is in a range of about 0.25:1 to 30:1.

26. The composite of claim 3, wherein the heat absorbing layer comprises from about 20 to about 50 weight percent intumescent substance, about 15 to about 50 weight percent heat resistant inorganic fiber, 0 to about 20 weight percent organic binder, and optionally 0 to about 50 weight percent char strength enhancer.

27. The composite of claim 4, wherein the heat absorbing layer comprises from about 20 to about 50 weight percent intumescent substance, about 15 to about 50 weight percent heat resistant inorganic fiber, 0 to about 20 weight percent organic binder, and optionally 0 to about 50 weight percent char strength enhancer.

28. The composite of claim 3, wherein the heat absorbing layer comprises an endothermic layer comprising from 0 to less than about 50 weight percent binder; from 0 to about 90 weight percent inorganic fiber; from 0 to about 50 weight percent endothermic filler, and optionally from 0 to about 20 weight percent opacifier, based on a total weight of the endothermic layer.

29. The composite of claim 3, wherein the heat absorbing layer comprises an endothermic layer comprising about 5 weight percent binder, about 85 weight percent inorganic fiber, about 5 weight percent endothermic filler and optionally about 5 weight percent opacifier, based on a total weight of the endothermic layer.

30. The composite of claim 4, wherein the heat absorbing layer comprises an endothermic layer comprising from 0 to less than about 50 weight percent binder; from 0 to about 90 weight percent inorganic fiber; from 0 to about 50 weight percent endothermic filler, and optionally from 0 to about 20 weight percent opacifier, based on a total weight of the endothermic layer.

31. The composite of claim 4, wherein the heat absorbing layer comprises an endothermic layer comprising about 5 weight percent binder, about 85 weight percent inorganic fiber, about 5 weight percent endothermic filler and optionally about 5 weight percent opacifier, based on a total weight of the endothermic layer.

32. The composite of claim 1, wherein the superinsulation material of said superinsulation layer comprises finely divided metal oxide and an opacifier, optionally reinforcing inorganic fibers and, optionally a binder.

33. The composite of claim 32, wherein the finely divided metal oxide comprises at least one of microporous silica, pyrogenic silicas, arc silicas, low-alkali precipitated silicas, silicon dioxide aerogels, pyrogenic aluminum oxides, arc aluminum oxides, low-alkali precipitated aluminum oxides, aluminum oxide aerogels, or mixtures thereof.

34. The composite of claim 32, wherein the opacifier comprises at least one of ilmenite, titanium dioxide, iron(II)/iron (III) mixed oxides, chromium dioxide, zirconium oxide, manganese dioxide, iron oxide, rutile, zirconium silicate, silicon carbide, or mixtures thereof.

35. The composite of claim 32, wherein the reinforcing inorganic fibers comprise at least one of aluminum silicate fibers, magnesium silicate fibers, calcium-magnesium-silicate fibers, rockwool fibers, textile glass fibers, quartz fibers, or combinations thereof.

36. The composite of claim 32, wherein the superinsulation layer comprises silicon dioxide and zirconium silicate, and optionally a reinforcing glass fiber.

37. The composite of claim 1, wherein the superinsulation layer has a specific heat capacity of about 0.8 KJ/kgK for temperatures from about 20° C. to about 800° C.

38. The composite of claim 1, wherein the superinsulation layer has a modulus of elasticity of greater than about 3 MPa for strains less than 0.02, and has a bulk density of greater than or equal to about 260 kg/m$^3$.

39. The composite of claim 1, wherein the superinsulation layer has a thermal conductivity less than 0.055 W/mK for mean temperatures less than 1000° C.

40. The composite of claim 1, wherein the superinsulation layer has a bulk density between about 25 kg/m$^3$ and about 500 kg/m$^3$.

41. The composite of claim 1, wherein the fibrous insulation layer and the inorganic heat absorbing layer each comprise an opacifier.

42. The composite of claim 1, wherein at least two layers of the multilayer thermal insulation composite are affixed together with at least one of an adhesive, needle bonding, or stitching.

43. A multilayer thermal insulation composite comprising:
   at least one superinsulation layer comprising a superinsulation material comprising one or more of an aerogel, microfiber glass, or microporous silica;
   one or both of (i) at least one fibrous insulation layer comprising inorganic fibers or (ii) at least one inorganic heat absorbing layer; and
   a scrim layer disposed adjacent one or more of the layers of the composite, or disposed around the multilayer thermal insulation composite partially or totally encapsulating the composite.

44. A multilayer thermal insulation composite comprising:
   at least one superinsulation layer comprising a superinsulation material comprising one or more of an aerogel, microfiber glass, or microporous silica;
   (i) at least one inorganic heat absorbing layer and optionally (ii) at least one fibrous insulation layer comprising inorganic fibers;
   wherein the heat absorbing layer comprises an endothermic layer comprising from 0 to less than about 50 weight percent binder; from 0 to about 90 weight percent inorganic fiber; from 0 to about 50 weight percent endothermic filler, and optionally from 0 to about 20 weight percent opacifier, based on a total weight of the endothermic layer.

* * * * *